United States Patent
Saito et al.

(10) Patent No.: US 7,569,966 B2
(45) Date of Patent: Aug. 4, 2009

(54) ROTATING ELECTRICAL MACHINE AND COIL

(75) Inventors: Yasuyuki Saito, Tokyo (JP); Takashi Yasuhara, Tokyo (JP); Hidemitsu Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 11/200,198

(22) Filed: Aug. 10, 2005

(65) Prior Publication Data
US 2006/0066167 A1    Mar. 30, 2006

(30) Foreign Application Priority Data
Sep. 30, 2004   (JP)   ............... 2004-286571

(51) Int. Cl.
*H02K 3/04* (2006.01)
(52) U.S. Cl. ...................... 310/201; 310/179
(58) Field of Classification Search .............. 310/179, 310/201, 202, 203, 208
See application file for complete search history.

(56) References Cited

U.S. PATENT DOCUMENTS

| | | | |
|---|---|---|---|
| 5,886,444 A | * | 3/1999 | Enomoto et al. ............ 310/208 |
| 5,926,940 A | | 7/1999 | Toh et al. |
| 6,049,154 A | * | 4/2000 | Asao et al. .................. 310/201 |
| 6,481,517 B1 | | 11/2002 | Kobayashi et al. |

FOREIGN PATENT DOCUMENTS

| | | |
|---|---|---|
| JP | 59-167461 | 11/1984 |
| JP | 9-215238 | 8/1997 |
| JP | 09-215238 | 8/1997 |
| JP | 10-066314 | 3/1998 |
| JP | 10-271733 | 10/1998 |
| JP | 11-078558 | 3/1999 |
| JP | 2002-051489 | 2/2002 |
| JP | 2002-330572 | 11/2002 |
| JP | 2002-345216 | 11/2002 |

* cited by examiner

Primary Examiner—Nguyen N Hanh
(74) Attorney, Agent, or Firm—Crowell & Moring LLP

(57) ABSTRACT

A stator coil, being a rectangular coil, is wound on a salient pole, striding across a plurality of slots, while being inserted sequentially through the inlet of a predetermined slot of the stator core. The stator coil comprises two slot inserts and to be inserted into the slot; two coil ends and located outside the end of the slot; and four twist sections arranged between the slot inserts and coil ends, processed by twisting. In the twist sections, twisting is applied to ensure that the surface of the rectangular coil in the second coil end will be opposite to the surface of the rectangular coil in the first coil end. The start of winding of the rectangular coil and the end of winding of the same coil are located on the same surface. Thereby, a rotating electrical machine with the large internal dimensions without increasing the external dimensions is achieved.

8 Claims, 8 Drawing Sheets

FIG. 2

ROTATING ELECTRICAL MACHINE AND COIL

CLAIM OF PRIORITY

The present application claims priority from Japanese application serial no. 2004-286571, filed on Sep. 30, 2004, the content of which is hereby incorporated by reference into this application.

FIELD OF THE INVENTION

The present invention relates to a rotating electrical machine and an electrical winding.

BACKGROUND OF THE INVENTION

In one of the prior art rotating electrical machines disclosed in the Patent Document 1, the three-phase stator coils of distributed winding are configured to ensure the coil end of a phase does not interfere with the coil end of other phase. This structure avoids the possibility of interference of the three-phase coil ends, and hence increases the length of a rotating electrical machine in the axial direction. Other known prior arts are disclosed in the following Patent Documents 2 through 5:

Patent Document 1: Japanese Patent Laid-Open No. 2002-51489

Patent Document 2: Japanese Patent Laid-Open No. Hei 10 (1998)-271733

Patent Document 3: Japanese Patent Laid-Open No. Hei 09 (1997)-215238

Patent Document 4: Japanese Patent Laid-Open No. 2002-345216

Patent Document 5: Japanese Patent Laid-Open No. 2002-330572

SUMMARY OF THE INVENTION

The prior art hybrid electric vehicle (HEV) is typically designed to have a structure wherein a motor or motor/generator is added to the vehicle using the existing internal combustion engine. In some cases, a motor is installed so as to be attached to the internal combustion engine, in the power transmission system of a vehicle composed of an internal combustion engine, a transmission and wheels. In other cases, a motor is installed serially between the internal combustion engine and transmission.

In recent years, there is an active demand for further downsizing of the internal combustion engine, motor and transmission. The inventors of the present invention have been studying to find out a way to meet the requirements for downsizing by installing other equipment inside the motor. For example, the overall size can be reduced by placing part of the transmission inside the motor. When other equipment, for example, part of the transmission is placed inside the motor, the outer periphery of the motor will increase. Such problems have been left unsolved in the prior art.

In view of the prior art described above, it is an object of the present invention to provide a rotating electrical machine and an electrical winding that permit the internal dimensions to be increased, without allowing an increase in the external dimensions.

The present invention provides a rotating electrical machine that permits the internal dimensions to be increased, without allowing an increase in the external dimensions.

The present invention further provides an electrical winding suitable for use with the aforementioned rotating electrical machine.

To achieve the aforementioned object, the present invention provides a rotating electrical machine comprising:

a stator with three phase stator coils wound on the salient poles of a stator core according to distributed winding method; and a rotor, arranged inside the aforementioned stator and supported rotatably, having a plurality of permanent magnets spaced at regular intervals arranged in the circumferential direction;

wherein the inlet of the slot of the aforementioned stator core is narrower than the inner part, and the aforementioned coils, being rectangular coils, are wound on the aforementioned salient pole, striding across a plurality of slots, while being inserted sequentially through the inlet of a predetermined slot of the aforementioned stator core; and comprise:

two slot inserts to be inserted into the aforementioned slot;

two coil ends located outside the end of the aforementioned slot; and four twist sections, arranged between the aforementioned slot inserts and coil ends, processed by twisting; and wherein, while the coils equivalent to a plurality of turns are wound on the aforementioned salient pole, twisting is provided by the aforementioned twist sections to ensure that the surface of the aforementioned rectangular coil in the second coil end will be opposite to the surface of the aforementioned rectangular coil in the first coil end; and the aforementioned coil ends are configured in such a way that the start of the rectangular coil winding and the end of the rectangular coil winding are located on one and the same side.

This arrangement provides a rotating electrical machine characterized in that the external dimensions thereof hardly change even when the input shaft of a transmission or the like penetrates the interior.

To achieve the aforementioned object, the present invention provides a coil used in the aforementioned stator of a rotating electrical machine composed of a stator and rotor, wherein the aforementioned coil, being a rectangular coil, is wound on the aforementioned salient pole, striding across a plurality of slots, while being inserted sequentially through the inlet of a predetermined slot of the aforementioned stator core; and comprises:

two slot inserts to be inserted into the aforementioned slot;

two coil ends located outside the end of the aforementioned slot; and four twist sections, arranged between the aforementioned slot inserts and coil ends, processed by twisting; and wherein, while the coils equivalent to a plurality of turns are wound on the aforementioned salient pole, twisting is provided by the aforementioned twist sections to ensure that the surface of the aforementioned rectangular coil in the second coil end will be opposite to the surface of the aforementioned rectangular coil in the first coil end; and the aforementioned coil ends are configured in such a way that the start of the rectangular coil winding and the end of the rectangular coil winding are located on one and the same side.

To achieve the aforementioned object, the present invention provides a rotating electrical machine comprising:

a stator; and a rotor, arranged inside the stator, rotatably shaft-supported through a gap on the peripheral surface of the stator;

wherein the aforementioned stator further comprises:

a stator core; and stator coils incorporated into the stator core;

wherein the aforementioned stator core has a plurality of slots, provided continuously in the axial direction, formed in the circumferential direction; and the aforementioned stator coils being composed of a plurality of phase coils continuously wound thereon, and the coil conductors being laminated;

wherein each of the aforementioned phase coils comprises:

two coil sides extending in the axial direction; and two coil ends, displaced by the twist section from both ends of the coil sides, extending in the circumferential direction;

wherein the aforementioned two coil sides are accommodated into the aforementioned two slots, separated with other, striding across the aforementioned slots;

wherein the aforementioned two coil ends protruding in both axial directions from the aforementioned slot are arranged on both ends of the aforementioned stator core in the axial direction;

wherein, of the aforementioned plurality of phase coils, a plurality of the first phase coils have the coil ends thereof arranged on both ends of the stator core in the axial direction so that the lamination direction of the aforementioned coil conductors in the aforementioned coil ends will be the same as the axial direction;

of the aforementioned plurality of phase coils, a plurality of the second phase coils have the coil ends thereof arranged on both ends of the stator core in the axial direction so that the lamination direction of the aforementioned coil conductors in the aforementioned coil ends will be changed from the axial direction to the radial direction; and the coil ends will stride across the adjacent twist sections of the first phase coil adjacent to each other in the circumferential direction, through the outside of the coil ends of the first phase coil; and wherein, of the aforementioned plurality of phase coils, a plurality of the third phase coils have the coil ends thereof arranged on both ends of the stator core in the axial direction so that the lamination direction of the aforementioned coil conductors in the aforementioned coil ends will be the same as the radial direction; and the coil ends will stride across the adjacent twist sections of the first and second phase coils adjacent to each other in the circumferential direction, through the outside of the coil ends of the first and second phase coils.

This arrangement provides a rotating electrical machine characterized in that the external dimensions thereof hardly change even when the input shaft of a transmission or the like penetrates the interior.

To achieve the aforementioned object, the present invention provides a rotating electrical machine, for providing a drive source for generating the drive force of a vehicle together with an internal combustion engine, arranged between a transmission for changing the drive force of the drive source and transmitting it to an axle, and the internal combustion engine; comprising:

a stator; and a rotor, arranged inside the stator, rotatably shaft-supported through a gap on the peripheral surface of the stator;

wherein the aforementioned stator further comprises:

a stator core; and stator coils incorporated into the stator core;

wherein the aforementioned stator core has a plurality of slots, provided continuously in the axial direction, formed in the circumferential direction; the aforementioned stator coils being composed of a plurality of phase coils continuously wound thereon, and the coil conductors being laminated;

wherein each of the aforementioned phase coils comprises:

two coil sides extending in the axial direction; and two coil ends, displaced by the twist section from both ends of the coil sides, extending in the circumferential direction;

wherein the aforementioned two coil sides are accommodated into the aforementioned two slots, separated with other, striding across the aforementioned slots;

wherein the aforementioned two coil ends protruding in both axial directions from the aforementioned slot are arranged on both ends of the aforementioned stator core in the axial direction;

wherein, of the aforementioned plurality of phase coils, a plurality of the first phase coils have the coil ends thereof arranged on both ends of the stator core in the axial direction so that the lamination direction of the aforementioned coil conductors in the aforementioned coil ends will be the same as the axial direction;

of the aforementioned plurality of phase coils, a plurality of the second phase coils have the coil ends thereof arranged on both ends of the stator core in the axial direction so that the lamination direction of the aforementioned coil conductors in the aforementioned coil ends will be changed from the axial direction to the radial direction; and the coil ends will stride across the adjacent twist sections of the first phase coil adjacent to each other in the circumferential direction, through the outside of the coil ends of the first phase coil; and wherein, of the aforementioned plurality of phase coils, a plurality of the third phase coils have the coil ends thereof arranged on both ends of the stator core in the axial direction so that the lamination direction of the aforementioned coil conductors in the aforementioned coil ends will be the same as the radial direction; and the coil ends will stride across the adjacent twist sections of the first and second phase coils adjacent to each other in the circumferential direction, through the outside of the coil ends of the first and second phase coils.

This arrangement provides a rotating electrical machine characterized in that the external dimensions thereof hardly change even when the input shaft of a transmission or the like penetrates the interior.

To achieve the aforementioned object, the present invention provides a rotating electrical machine, for providing a drive source for generating the drive force of a vehicle together with an internal combustion engine, arranged between a transmission for changing the drive force of the drive source and transmitting it to an axle, and the internal combustion engine; the aforementioned rotating electrical machine comprising:

a stator with three phase stator coils wound on the salient poles of a stator core according to distributed winding method; and a rotor, arranged inside the aforementioned stator and supported rotatably, having a plurality of permanent magnets spaced at regular intervals arranged in the circumferential direction;

wherein the inlet of the slot of the aforementioned stator core is narrower than the inner part, and the aforementioned coils, being rectangular coils, are wound on the aforementioned salient pole, striding across a plurality of slots, while being inserted sequentially through the inlet of a predetermined slot of the aforementioned stator core; and comprise:

two slot inserts to be inserted into the aforementioned slot;

two coil ends located outside the end of the aforementioned slot; and four twist sections, arranged between the aforementioned slot inserts and coil ends, processed by twisting; and wherein, while the coils equivalent to a plurality of turns are wound on the aforementioned salient pole, twisting is provided by the aforementioned twist sections to ensure that the surface of the aforementioned rectangular coil in the second coil end will be opposite to the surface of the aforementioned rectangular coil in the first coil end; and the aforementioned coil ends are configured in such a way that the start of the rectangular coil winding and the end of the rectangular coil winding are located on one and the same side.

This arrangement provides a rotating electrical machine characterized in that the external dimensions thereof hardly change even when the input shaft of a transmission or the like penetrates the interior.

The present invention creates a space for installing other equipment inside the motor. This space allows the whole or part of other equipment to be installed therein, and ensures a compact configuration to be designed.

BRIEF DESCRIPTION OF DRAWINGS

FIG. 2 is a cross sectional view representing an overall structure of a rotating electrical machine as an embodiment of the present invention;

DESCRIPTION OF THE PREFERRED EMBODIMENTS

Referring to FIGS. 1 through 7, the following describes the structure of the rotating electrical machine as an embodiment of the present invention. In the first place, FIGS. 1 and 2 will be used to explain the structure of the rotating electrical machine according to the present embodiment. In the present embodiment, an 8-pole 48-slot synchronous machine of distributed winding equipped with a built-in permanent magnet type rotor will be taken as an example for the following explanation.

Figure 1:
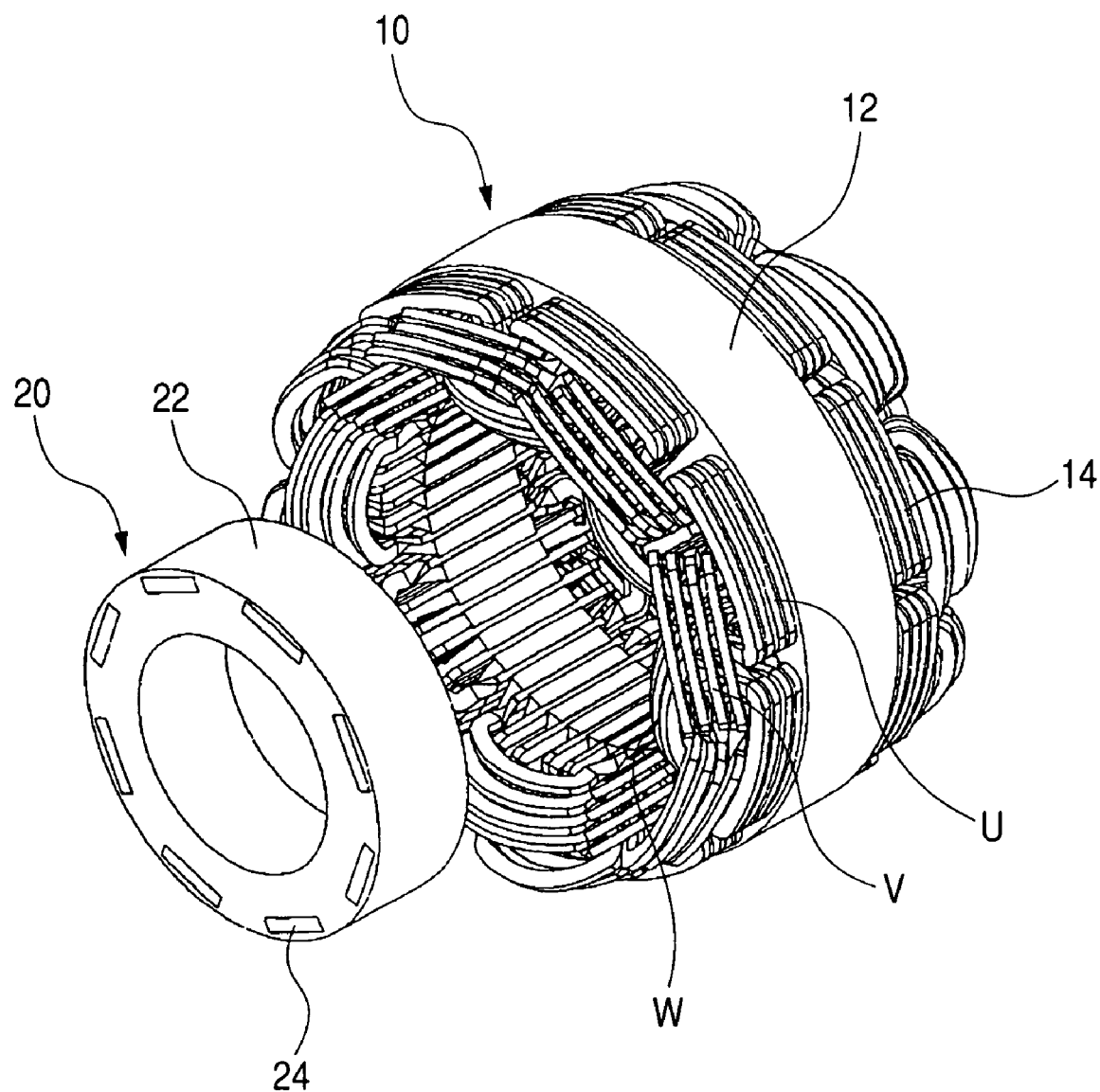
FIG. 1 is a perspective exploded view representing an overall structure of a rotating electrical machine as an embodiment of the present invention.
Figure 2:
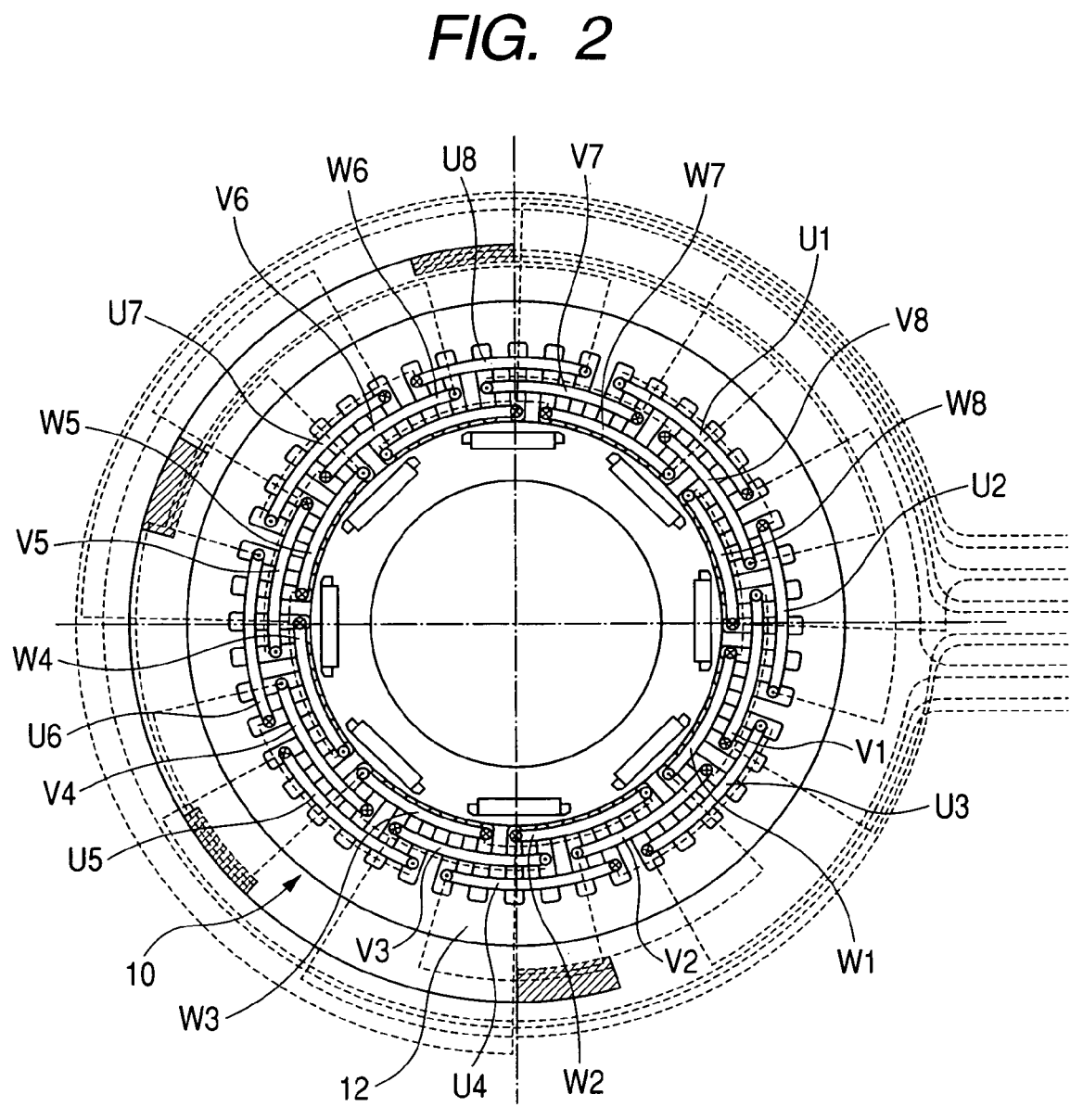

FIG. 1 is a perspective exploded view representing the structure of a rotating electrical machine as an embodiment of the present invention. FIG. 2 is a cross sectional view representing the structure of the rotating electrical machine as an embodiment of the present invention. It shows a cross section of a rotor given in FIG. 1, as viewed from the direction orthogonal to the axial direction. In the Figures, the same reference numerals indicate the same parts.

As shown in FIG. 1, the rotating electrical machine of the present invention comprises a stator 10 and a rotor 20 arranged through a gap on the inner periphery of the stator and supported rotatably. The stator 10 and rotor 20 are held in the housing of a rotating electrical machine. The housing is omitted in FIG. 1.

The stator 10 is composed of a stator core 12 and stator coil 14. The stator core 12 is formed by lamination of steel sheet metals having been pressed into a predetermined shape. The surface of the inner periphery of the stator core 12 is opened on the inner periphery of the stator core 12, and a plurality of slots are formed continuously in the axial direction. In this embodiment, 48 slots are formed. The stator coil 14 is wound on the stator core 12 according to distributed winding method. Distributed winding refers to the method of winding where the coil is wound on the stator core 12 so that the coil will be accommodated in two slots apart from each other, striding across a plurality of slots. The stator coil 14 is composed of a U-phase stator coil U, a V-phase stator coil V and a W-phase stator coil W.

The stator coil 14 is composed of a U-phase stator coil U, a V-phase stator coil V and a W-phase stator coil W that are continuously wound by laminating the coil conductors. As will be described later, each coil is provided with two coil sides extending in the axial direction; two coil ends, displaced from both ends of the coil side, extending in the circumferential direction; and a twist section constituting the displaced portions of the coil side and coil end. The two coil sides are accommodated in two slots apart from each other, striding across a plurality of slots. The two coil ends are arranged on the two end faces in the axial direction of the stator core 12 protruding from the slot in two axial directions.

The U-phase stator coil U has the coil ends thereof arranged on both end faces of the stator core 12 in the axial direction so that the lamination direction of the coil conductors on the coil ends will be the same as the axial direction.

The V-phase stator coil V has the coil ends thereof arranged on both ends of the stator core 12 in the axial direction so that the lamination direction of the coil conductors in the coil ends will be changed from the axial direction to the radial direction; and the coil ends will stride across the adjacent twist sections of the U-phase stator coil U adjacent to each other in the circumferential direction, through the outside of the coil ends of the U-phase stator coil U.

The W-phase stator coil W has the coil ends thereof arranged on both ends of the stator core 12 in the axial direction so that the lamination direction of the coil conductors in the coil ends will be the same as the radial direction; and the coil ends will stride across the adjacent twist sections of the U-phase stator coil U and V-phase stator coil V adjacent to each other in the circumferential direction, through the outside of the coil ends of the U-phase stator coil U and V-phase stator coil V.

The rotor 20 is composed of a rotor core 22 and a permanent magnet 24. The rotor core 22 is formed by lamination of steel sheet metals having been pressed into a predetermined shape. On the outer periphery of the stator core 22, a plurality of magnet insertion holes penetrating the rotor 20 in the axial direction are formed at an equally spaced interval in the circumferential direction. In the present embodiment, eight magnet insertion holes are formed. A permanent magnet 24 is inserted in each of the permanent magnet insertion holes and is fixed therein.

As shown in FIG. 2, the rotor 20 is rotatably supported by the housing (not illustrated) inside the stator 10. Eight stator coils 14 for each of phases U, V and W—a total of twenty-four stator coils U1, U2, ..., U8, V1, V2, ... V8, W1, W2, ... W8—are provided. Sandwiching in-between four slots for receiving other coils of phases V and W, namely, striding across the salient poles of a plurality of stator cores 12, each stator coil, for example, a stator coil U is inserted into the slots apart from each other and is wound on the salient pole of the stator core 12. The salient pole of the stator core 12 indicates the core portion formed between the slots adjacent to each other in the circumferential direction. Similarly, sandwiching in-between the four slots for receiving coils of other phases, namely, striding across the salient poles of a plurality of the stator cores 12, other coils of phases U, V and W are inserted into the slots apart from each other, and are wound on the salient pole of the stator core 12 according to distributed winding method. Since distributed winding method is employed, field weakening control and reluctance torque can be utilized to provide control over a wide range of speeds covering low through high speeds.

Twenty-four stator coils U1, U2, ..., U8, V1, V2, ... V8, W1, W2, ... W8 are connected by the connection ring indicated by a dotted line for each phase. This arrangement allows coils of phases U, V and W to be linked in a Y-connection or delta connection. The connection ring is composed of a bus bar composed of a thin plate-formed conductor, and is used to supply the aforementioned coil with 3-phase A.C. supplied from the inverter apparatus.

Eight permanent magnets 24 are placed into the permanent magnet insertion hole formed on the rotor core 22 of the rotor 20. The permanent magnets 24 are arranged at an equally spaced interval in the circumferential direction. The permanent magnets 24 are energized in such a way that the polarities (N and S) of the adjacent permanent magnets will be opposite to each other in the circumferential direction. The area of the rotor core 22 of the adjacent permanent magnets serves as an auxiliary magnetic pole. The auxiliary magnetic pole provides an area that bypasses the magnetic circuit of the permanent magnets 24 so that the magnetic flux will directly work on the side of the stator 10 through the electromotive force of the stator 10, and reluctance torque will be produced. The torque produced by the rotating electrical machine can be obtained as a composite torque between the torque produced by the magnetic flux of the permanent magnets 24 and the reluctance torque generated by the magnetic flux flowing to the auxiliary magnetic pole.

The permanent magnet insertion hole into which the permanent magnets 24 are placed is provided with magnetic gaps (slits) AG1 and AG2, which are located on both ends in the circumferential direction where the permanent magnets 24 are inserted. These gaps can be gaps containing air, or gaps filled with filler such as varnish. The magnetic permeability of the varnish is greater than that of the silicon steel plate constituting the rotor core 22. Arrangement of these gaps brings about an abrupt alleviation of the magnetic flux density on the rotor surface (i.e., alleviation of the inclination of distribution of the magnetic flux density of the permanent magnet between the end of the permanent magnet in the circumferential direction and auxiliary magnetic pole), whereby cogging torque is reduced. Further, formation of magnetic gaps reduces the radial dimension of the bridge portion formed on the boundary between the core portion (magnetic piece) present on the stator side of the permanent magnet and the auxiliary magnetic pole, hence the leakage of the magnetic flux is reduced.

As shown in FIG. 2, a large through-hole (annular space) is formed in the center of the rotor 20 (between the inner periphery of the rotor core and the outer periphery of the rotary shaft (extending from the engine to the transmission)). The end of the transmission, for example, is installed inside this through-hole (annular space). To be more specific, the rotating electrical machine of the present embodiment can be installed so as to be located on the outer periphery of the transmission.

In this embodiment, the inner diameter (diameter) of the through-hole (annular space) in the center of the rotor 20 can be increased up to 140 mm, for example. Further, when the output of the motor as a rotating electrical machine is assumed as 60 kW, for example, the outer diameter of the prior art motor is 240 mm, for example. A cylindrical frame is mounted on the outer periphery of the stator. An exterior case such as a front bracket or rear bracket is mounted on both ends of the stator. In the following description, the outer diameter of the stator is assumed as the outer diameter of the motor. In the prior art motor, a shaft is arranged at the center of the rotor. By contrast, the rotating electrical machine of the present invention has a through-hole at the center of the rotor. This arrangement increases the outer diameter of the rotating electrical machine if the same output as the prior art output is to be obtained.

To cope with this problem, the present embodiment provides a rotor outer diameter of 240 mm, which is the same as the outer diameter of the prior art rotor. Moreover, the inner diameter of the through-hole can be increased up to 140 mm. A stator and rotor are mounted between the aforementioned inner diameter and outer diameter. Accordingly, the thickness of the stator 10 (thickness of the stator 10 in the radial direction of the rotating electrical machine) and the thickness of the rotor 20 (thickness of the rotor 10 in the radial direction of the rotating electrical machine) must be reduced.

The output torque T of the motor is obtained by the applied current "I" by the magnetic flux $\phi M$ produced by the permanent magnet and the magnetic flux $\phi C$ produced by the stator coil 14 ($T=(\phi M+\phi C)\times I$)). If the size of the permanent magnet is about the same as the prior art level, the sectional area of the stator coil 14 should be about the same as the prior art level. Further, to ensure that the electromotive force produced from the stator coil 14 is also kept about the same as the prior art level, about the same number of turns should be used at about the same current as the prior art level, for example. To allow the current to flow at about the same current as the prior art level, it is necessary to provide about the same sectional area as the prior art one. In the present embodiment, the sectional area of the stator coil 14 is secured and the dimension in the radial direction is reduced, in addition. The present embodiment uses a flat rectangular conductor characterized by a longer width and smaller height where the stator coil 14 has a rectangular cross section. At the same time, coils are laminated in the slot of the stator coil 14 in such a way that the aforementioned direction of height of the stator coil will be the radial direction.

Figure 3:
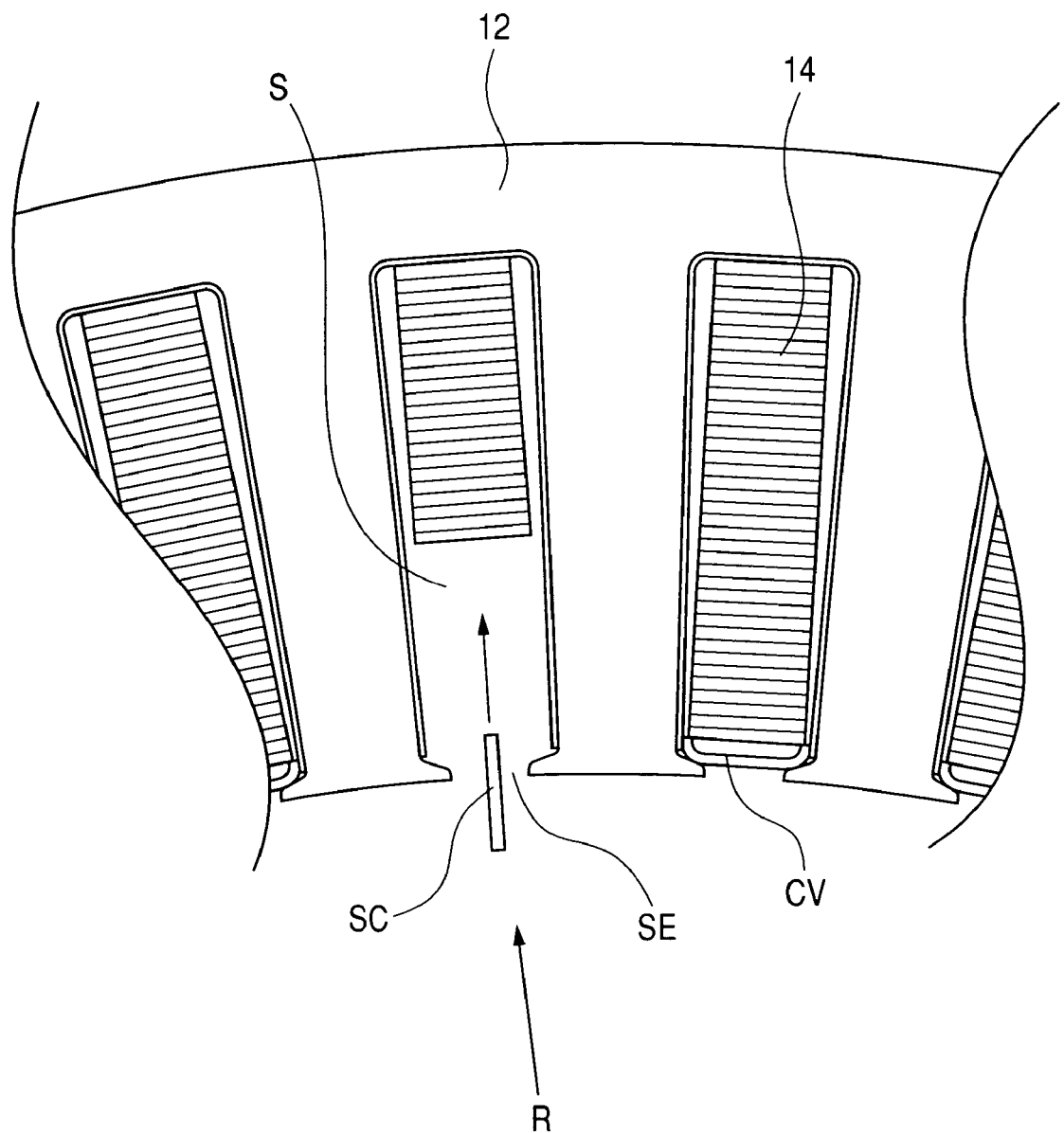
FIG. 3 is a cross sectional view showing the status of the stator coil inserted into the stator core slot in a rotating electrical machine as an embodiment of the present invention.

Referring to FIG. 3, the following describes the status of the stator coil inserted into the stator core slot in a rotating electrical machine of the present embodiment. FIG. 3 is a cross sectional view showing the status of the stator coil inserted into the stator core slot in a rotating electrical machine as an embodiment of the present invention. It also shows the cross section as viewed in the direction orthogonal to the axial direction of the stator core 12 shown in FIG. 2. The same reference numerals are used to indicate the same component parts in FIG. 3 and other Figures.

As shown in FIG. 3, inside the slot S formed on the stator core 12, rectangular coils SC having a rectangular cross section are laminated in the radial direction (R-arrow marked direction) of the stator core 12. In the present embodiment, 38 rectangular coils are laminated, whereby the stator coil 14 is formed. As described above, to increase the current flowing through the stator coil, the cross section must be increased. To reduce the lamination dimensions while maintaining the cross section of the stator coil, the cross section of the stator coil is formed in a rectangular shape having a smaller height and greater width. When the cross section of the stator coil is designed in a rectangular form as described above, the lamination dimensions can be minimized and coils can be inserted from the opening of a slender slot S. After the stator coil 14 has been installed in the slot S, a cover CV is placed on the inlet side of the slot S to ensure that the coil will not be disengaged from the slot S.

Assume that the circular conductor, having a circular cross section, used in the rotating electrical machine for producing the same output as that of the prior art has a diameter of 1.5 mm. Then when the cross section of the rectangular conductor of the stator coil 14 used in the present embodiment is 3.5 mm wide and 0.5 mm thick, the sectional areas of the two can be made equal to each other. The surface of the rectangular conductor is covered with an insulation material, having a thickness of about 0.05 mm, such as enamel, whereby a rectangular coil is formed. The rectangular coil is 3.6 mm wide (in terms of width in the circumferential direction), and 0.6 mm thick (high). The width of the inner part of the slot S, i.e. the portion holding the laminated coil is 4.0 mm—a value slightly greater than the width of this rectangular coil. When the output about the same as the prior art output is assumed, a coil having 38 turns will be used inside the slot S. Thirty-eight rectangular coils are laminated in the present embodiment.

The width of the opening of the slot S is smaller than the width of the portion holding the laminated coil as the inner part of the slot S. For example, the width of the opening is 2.6 mm. A coil formed by preliminary winding of the rectangular coil by 38 turns cannot be inserted through the inlet of the slot S. Accordingly, as illustrated, in the inlet of the slot S, each rectangular coil SC is inserted into the slot S from the inlet (opening) of the slot S in the radial direction of the stator core 12 so as to ensure conformity of the longitudinal direction of the rectangular coils SC. By so doing, the rectangular coil for 38 turns are wound, striding across a plurality of salient poles. The depth (depth in the R-arrow marked direction) of the wide portion (4.0 mm) of the slot S is 23 mm—a value greater than the thickness of 22.8 mm when 38 rectangular coils SC have been laminated.

As described above, a rectangular conductor as a conductor forming the coil is obtained from the circular conductor. This method increases the percentage of the coil with respect to the space (coil space factor) in the slot. Further, the sectional area is formed in a slender and rectangular shape. This arrangement allows the thickness of the stator core 12 (thickness of the rotating electrical machine in the radial direction) to be reduced. It should be added that, when a normal circular conductor is used, the coil space factor is about 65%. Use of the rectangular conductor of the present embodiment allows the coil space factor to be increased up to 85%.

To get the same output as that of the prior art rotating electrical machine having an outer diameter of 240 mm, the outer diameter of the rotating electrical machine as the present embodiment can be 240 mm, and the inner diameter of the stator core 12 can be 180 mm. Further, in this case, if the distance of the gap between the inner periphery of the stator 10 and the outer periphery of the rotor 20 is 1 mm, the outer diameter of the rotor 20 is 178 mm, and the inner diameter of the through-hole on the inner periphery of the rotor 20 is 140 mm. The external dimensions are the same as those of the prior art product, and the output of the same level can be obtained. Moreover, this arrangement provides the rotating electrical machine having a through-hole at the center.

In the aforementioned description, the dimension of the stator coil across the thickness (height) is 0.6 mm. This dimension is preferably in the range from 1 mm through 0.4 mm, for example.

In the present embodiment, a coil is inserted through the opening of the slot. It is also possible to make such arrangements that the stator core is divided, and after the stator coil has been mounted, the divided stator cores are integrated into one piece, whereby the stator is produced.

Figure 4:
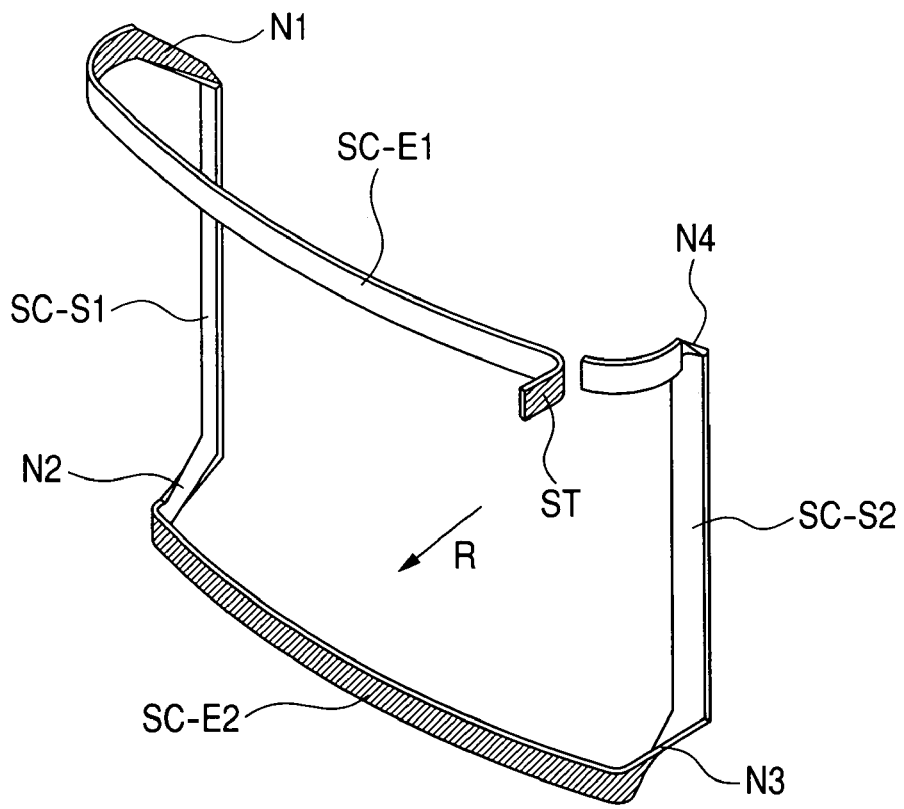
FIG. 4 is a perspective view showing the shape of the coil for one turn, the coil being a stator coil used in a rotating electrical machine as an embodiment of the present invention.

Referring to FIGS. 4 through 7, the following describes the shape of the stator coil used in the rotating electrical machine as an embodiment of the present invention. In the first place, FIG. 4 will be used to explain the shape of the coil for one turn of the stator coil used in the rotating electrical machine as the present embodiment. FIG. 4 is a perspective view showing the shape of the coil for one turn.

As illustrated, the coil SC for one turn has an approximately rectangular configuration. The coils SC for one turn are approximately parallel to each other, and comprises the first and second slot inserts SC-S1 and SC-S2 as the straight lines to be inserted into the stator core slots, and the first and second coil ends SC-E1 and SC-E2 connected to both ends of each of the slot inserts SC-S1 and SC-S2. Twist sections N1, N2, N3 and N4 are provided between the first and second slot inserts SC-S1 and SC-S2, and the first and second coil ends SC-E1 and SC-E2.

The coil SC illustrated in the drawing is formed by bending one rectangular coil. To be more specific, assume that winding starts from the start of winding ST in the drawing. In the first place, the first coil end SC-E1 is formed. Then the rectangular coil is twisted to form a twist section N1. As shown in FIG. 3, the longitudinal direction of the rectangular coil SC will conform to the radial direction R of the slot S, so that the first slot insert SC-S1 passes through the narrow portion of the inlet of the slot S. This procedure allows the coil to be inserted into the slot S. The rectangular coil is twisted at the position where the first slot insert SC-S1 has come out of the slot S, so that the twist section N2 is formed, whereby the second coil end SC-E2 is formed. The second coil end SC-E2 extends from the position of the slot where the first slot insert SC-S1 is inserted, to the position where the slots for four coils are stridden across. After that, the rectangular coil is again twisted at the next slot position, whereby the twist section N3 is formed. Then the second slot insert SC-S2 is formed. Further, the rectangular coil is twisted to form a twist section N4. Then the end of the next coil turn is formed.

The rectangular coil SC has two wide surfaces opposed to each other. One of these surfaces is called a front surface, and the other is called a back surface. To distinguish between the two, the side corresponding to the back surface is provided with oblique lines in FIG. 4. To be more specific, in the illustrated state, the front surfaces of the first coil end SC-E1, and the first and second slot inserts SC-S1 and SC-S2 are located in the foreground. Since twist sections N1, N2, N3 and N4 are provided between the first and second slot inserts SC-S1 and SC-S2, and the first and second coil ends SC-E1 and SC-E2, the back surface of the second coil end SC-E2 is located in the foreground. To be more specific, in the present embodiment, twist sections are provided between the coil ends and slot inserts. Accordingly, the different surfaces of first coil end SC-E1 and second coil end SC-E2 are located in the same direction.

The twist section N1 changes the direction in which the first coil end SC-E1 extends, to the orthogonal direction (the direction in which the first slot insert SC-S1 extends). This twist section N1 further displaces the coil conductors in such a way that the lamination direction of the coil conductors in the first slot insert SC-S1 will be the same as that of the coil conductors in the first coil end SC-E1 (i.e. from top to bottom layers), and the front surface of the coil conductor located in the foreground in the first coil end SC-E1 will be located in the foreground in the first slot insert SC-S1 as well.

The twist section N2 changes the direction in which the first slot insert SC-S1 extends, to the orthogonal direction (the direction in which the second coil end SC-E2 extends). This twist section N2 further displaces the coil conductors in such a way that the lamination direction of the coil conductors in the second coil end SC-E2 will be the same as that of the coil conductors in the first slot insert SC-S1 (i.e. from bottom to top layers), and the front surface of the coil conductor located in the foreground in the first slot insert SC-S1 will be located in the background in the second coil end SC-E2 (the back surface of the coil conductor will be located in the background).

The twist section N3 changes the direction in which the second coil end SC-E2 extends, to the orthogonal direction (the direction in which the second slot insert SC-S2 extends). This twist section N3 further displaces the coil conductors in such a way that the lamination direction of the coil conductors in the second slot insert SC-S2 will be different from that of the coil conductors in the slot coil end SC-E2 (i.e. from top to bottom layers), and the back surface of the coil conductor located in the foreground in the second coil end SC-E2 will be located in the background in the second slot insert SC-S2 as well.

The twist section N4 changes the direction in which the second slot insert SC-S2 extends, to the orthogonal direction (the direction in which the first coil end SC-E1 extends). This twist section N4 further displaces the coil conductors in such a way that the lamination direction of the coil conductors in the first coil end SC-E1 will be the same as that of the coil conductors in the second slot insert SC-S2 (i.e. from top to bottom layers), and the front surface of the coil conductor located in the foreground in the second slot insert SC-S2 will be located in the foreground in the first coil end SC-E1 as well.

The reason why processing of twisting is applied to provide such surface configuration will be described later with reference to FIG. 5.

Figure 5:
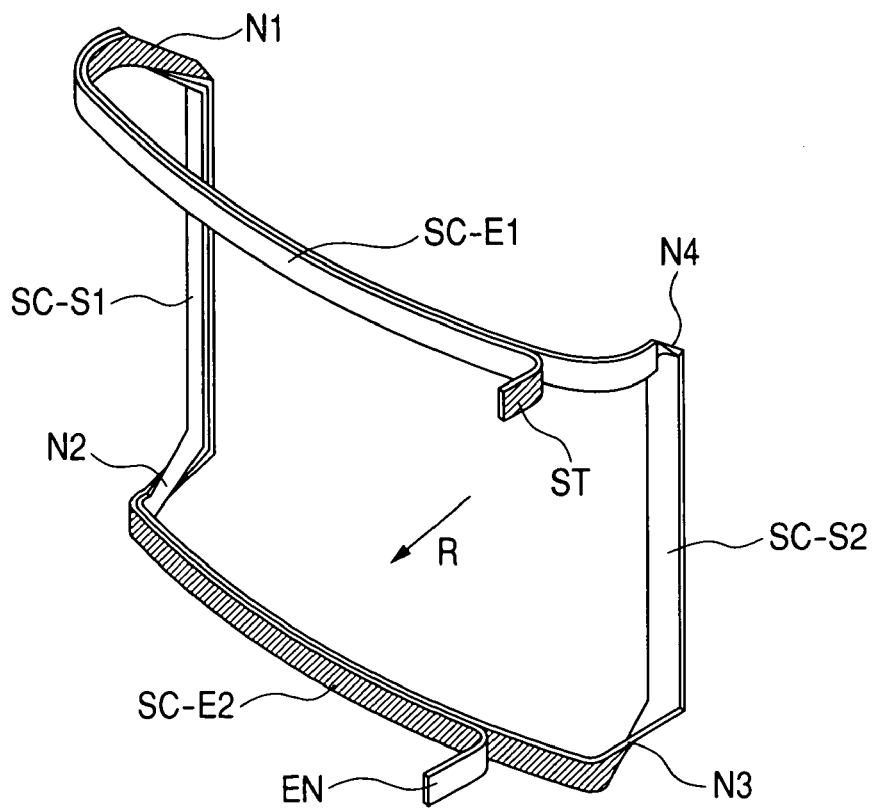
FIG. 5 is a perspective view representing the shape of the stator coil for 1.5 turns, used in the rotating electrical machine as an embodiment of the present invention.

Referring to FIG. 5, the following describes the shape of the stator coil equivalent to 1.5 turns, used in the rotating electrical machine of the present invention. FIG. 5 is a perspective view representing the shape of the stator coil for 1.5 turns, used in the rotating electrical machine as an embodiment of the present invention.

FIG. 5 shows formation of a coil for 1 turn. This step is followed by the process of forming the first coil end SC-E1, twist section N1, first slot insert SC-S1, twist section N2 and second coil end SC-E2 in that order up to the middle of the second turn. The terminal of the second coil end SC-E2 is given as an end of winding EN.

As described above, a twist section is provided between the coil end and slot insert, with the result that the first coil end SC-E1 and second coil end SC-E2 are formed in such a way that different surfaces face in the same direction. This arrangement allows the start of winding ST and end of winding EN, to be located on the same sides. The first slot inserts on the left of the Figure are provided in two layers, while the second slot insert on the right is provided in one layer. This will be called a 1.5-turn layer coil in the following description.

The arrow mark R in the drawing indicates the radial direction of the rotating electrical machine (direction of depth of the slot on the stator core). On the first coil end side on the top, lamination is sequentially carried out laminated, starting from the outer periphery in the radial direction (the inner part of the slot of the stator core). By contrast, on the second coil end side on the bottom, lamination is sequentially carried out laminated, starting from the inner periphery in the radial direction (the inlet of the slot of the stator core).

Figure 6:
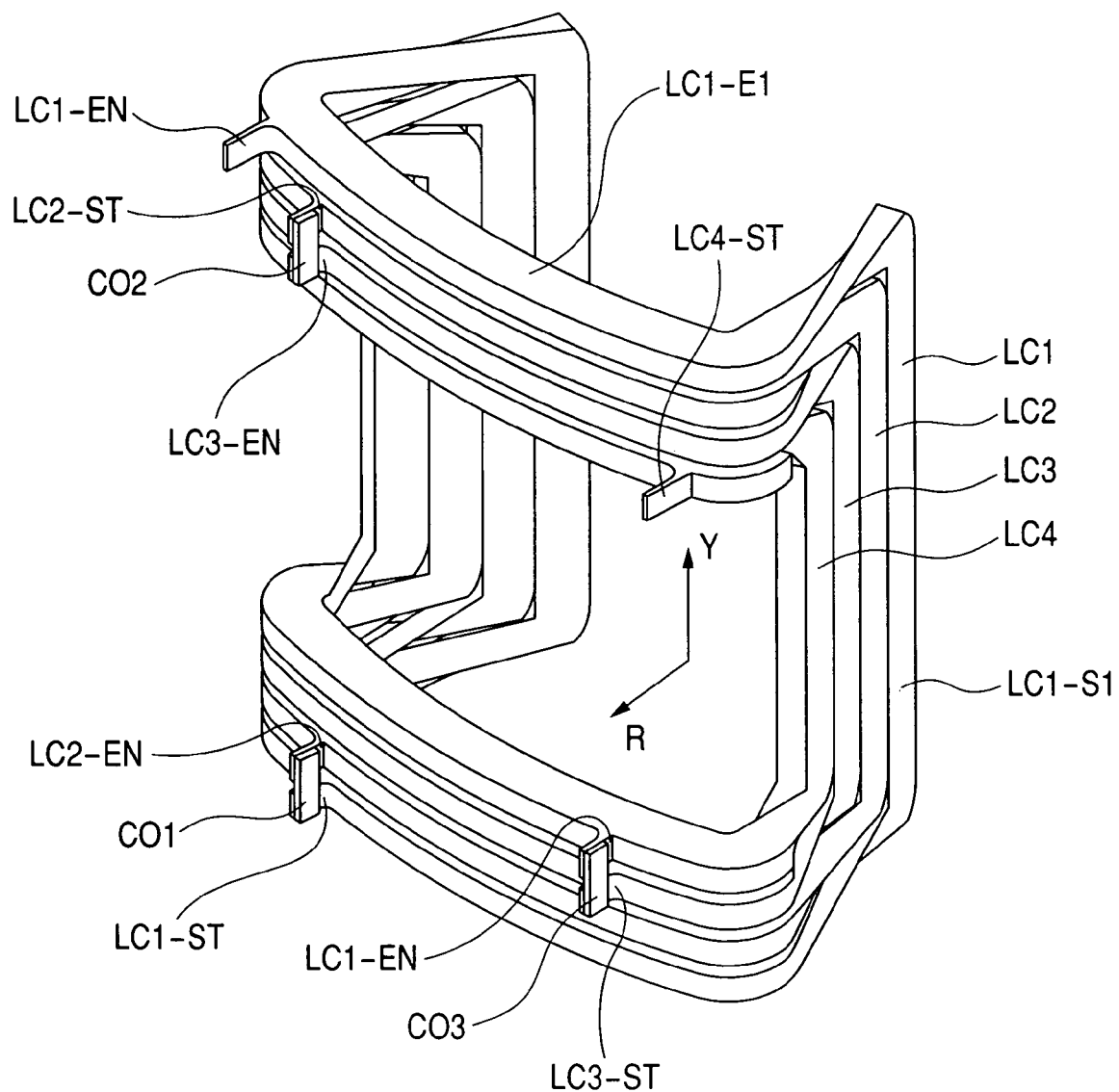
FIG. 6 is a perspective view representing the shape of the stator coil of 38 turns used in the rotating electrical machine as an embodiment of the present invention.

Referring to FIG. 6, the following describes the shape of the stator coil of 38 turns used in the rotating electrical machine as an embodiment of the present invention. FIG. 6 is a perspective view representing the shape of the stator coil of 38 turns used in the rotating electrical machine as an embodiment of the present invention.

For example, when 38 turns (38 T) are required, the following step is taken, as described with reference to FIG. 3: The slot insert is inserted into the slot by ensuring the longitudinal direction of the rectangular coil SC will conform to the radial direction R of the slot S in order to permit passage through the narrow portion of the inlet of the slot S. While this step is taken, a twist section is provided between the slot insert and coil end, whereby the coil is formed. When this method is used, it is difficult to complete 38 turns (38 T) in one operation.

In the present embodiment, a 38-turn layer coil is divided into four 9.5-turn layer coils. Each of these coils is produced in the same procedure. After that, four-layer coils are integrated into one piece, whereby a 38-turn coil is obtained.

To be more specific, as shown in FIG. 6, four layer coils for the 9.5-turn layer coil, LC1, LC2, LC3 and LC4 are formed sequentially according to the same method. In this case, when two 9.5-turn layer coils are connected with each other and one of the slot inserts of one layer coil covers 9 layers, means are taken to ensure the slot insert of the other layer coil covers 10 layers. Then these two coils are connected with each other, thereby getting a 19-turn coil. Further, the ends of the first 19-turn coil and second 19-turn second coil are connected to get a 38-turn coil.

The ends of the layer coils, LC1, LC2, LC3 and LC4, are connected follows: The start of winding LC1-ST of the first layer coil LC1 and the end of winding LC2-EN of the second layer coil LC2 are connected by aging, using the connector CON1, in a manner similar to putting the plate-formed conductors such as bus bars one on top of another. The start of winding LC2-ST of the second layer coil LC2 and the end of winding LC3-EN of the third layer coil LC3 are connected by aging, using the connector CON2, in a manner similar to putting the plate-formed conductors such as bus bars one on top of another. Further, the start of winding LC3-ST of the third layer coil LC3 and the end of winding LC4-EN of the fourth layer coil LC4 are connected by aging, using the aforementioned connector CON3. As a result, the end of winding LC1-EN of the first layer coil LC1 and the start of winding LC4-ST of the fourth layer coil LC4 are left behind as an overall start of coil to be wound, and an overall end of coil to be wound, having 38 turns. These two points provide one terminal of the coil. This terminal is connected by connection ring, as shown in FIG. 2, thereby yielding a coil of 3-phase distributed winding according to the Y-connection or delta-connection method, as required.

As shown in FIG. 5, a twist section is provided between the coil end and slot insert so that the start and end of coil winding are located on the same surface. Accordingly, after several rectangular coils are laminated to form a layer coil, this arrangement facilitates the work of connecting between layer coils as well as the work of wiring the thee-phase stator coil formed by serial connection of a plurality of layer coils.

The arrow mark Y of the Figure indicates the direction in which the rotary shaft of the rotating electrical machine rotates. For example, the thickness of the end of winding LC1-E1 on the upper side of the first layer coil LC1 in the direction of arrow mark Y is equal to the width of the coil conductor constituting the layer coil. In the aforementioned example, this thickness is 3.6 mm. When the direction of arrow mark R is assumed to indicate the radial direction of the rotating electrical machine, then the thickness of the slot insert LCS1-S1 on the right of the first layer coil LC1 in the direction of arrow mark R, for example, is the same as the thickness when ten coil conductors constituting the layer coil have been laminated. In the aforementioned example, this thickness is 6.0 mm (0.6 mm×10 layers). As shown with reference to FIG. 4, a twist section is provided between the coil end of the layer coil and the slot insert. Because of this arrangement, the thickness of the coil end of the layer coil in the direction of arrow mark Y can be made equal to the width of the coil conductor, without being restricted to the number of layers of the coil conductor constituting the layer coil. When a 38-turn coil is formed using four layer coils LC1, LC2, LC3 and LC4, the thickness of the coil end of this coil in the direction of arrow mark Y can be equivalent to four widths of the coil conductor constituting the layer coil, i.e., 14.4 mm, in the case of the aforementioned example. This arrangement can reduce the length of the coil end of the rotating electrical machine.

Whereas four layer coils LC1, LC2, LC3 and LC4 are laminated in the radial direction (indicated by arrow mark R) in the slot insert, they are laminated in the axial direction (indicated by arrow mark Y) in the coil end.

Figure 7:
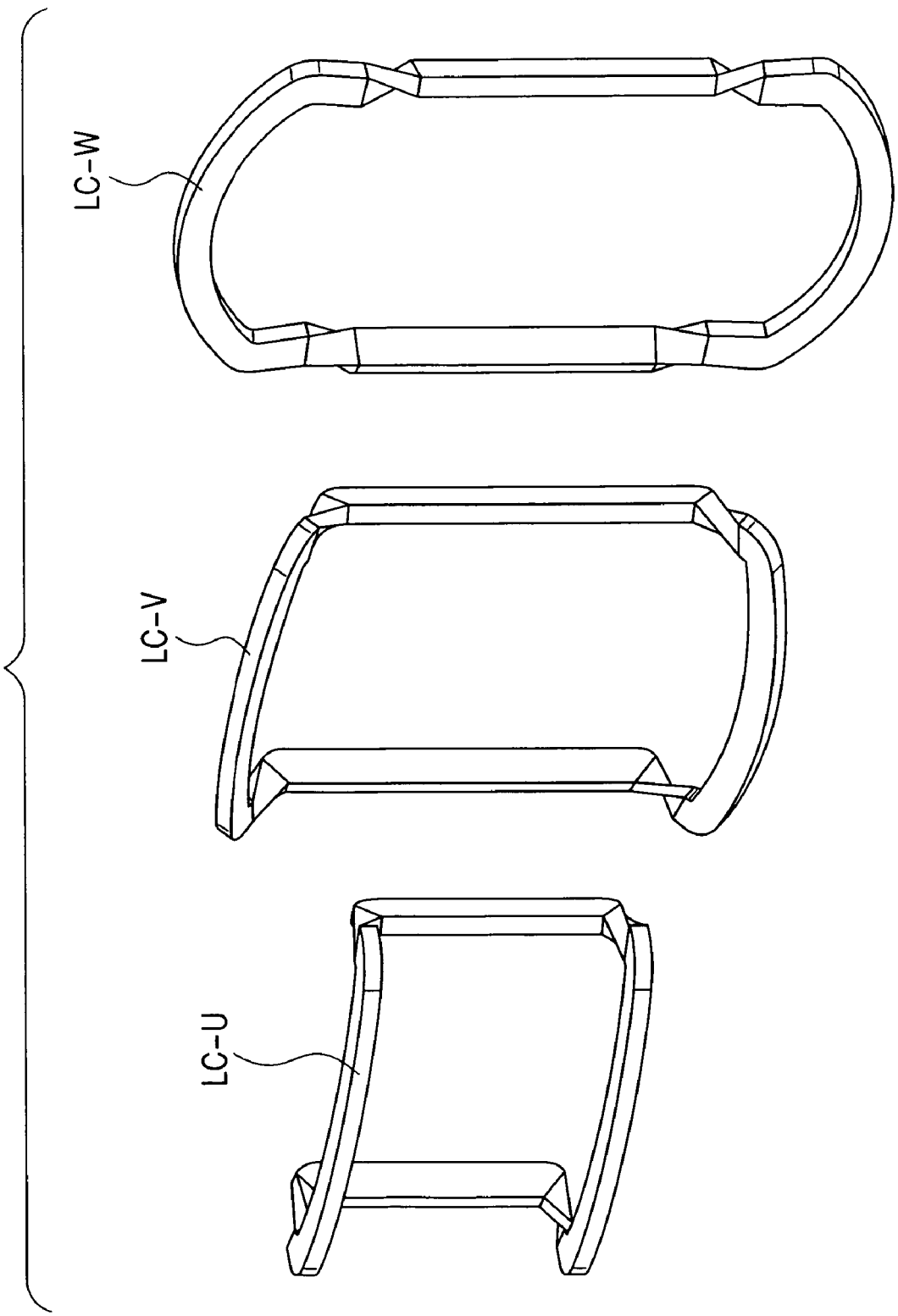
FIG. 7 is a perspective view representing the three-phase coil used in the rotating electrical machine as an embodiment of the present invention.

Referring to FIG. 7, the following describes the shape of the three-phase coil used in the rotating electrical machine as the present embodiment. FIG. 7 is a perspective view representing the three-phase coil used in the rotating electrical machine as an embodiment of the present invention.

In the present embodiment, three-phase coils of phases U, V and W are utilized. They are inserted into the slot of the stator core in a predetermined sequence, for example, in the sequence of phases U, V and W. After the U-phase coil has been inserted, the V-phase coil is inserted. The U-phase coil end should not interfere with the V-phase coil end, and the V-phase coil end should not interfere with the W-phase coil end. To ensure that such an inference will not occur, the U-, V- and W-phase coils are designed to have different configurations.

FIG. 7 shows a U-phase layer coil LC-U forming a U-phase coil, a V-phase layer coil LC-V forming a V-phase coil, and a W-phase layer coil LC-W forming a W-phase coil. The layer coils LC-U, LC-V and LC-W in the circumferential direction have the same length. As shown in FIG. 7, however, in the coil end, the coil end of the layer coil LC-U is bent about 90 degrees with respect to the slot insert. Further, the coil end of the V-phase layer coil LC-V is bent about 45 degrees with respect to the slot insert. The coil end of the W-phase layer coil LC-W is extended in the direction where the slot insert is extended. The aforementioned configuration of the 3-phase coils prevents interference among the U-phase coil end, V-phase coil end and W-phase coil end.

When the coil of each phase bent in the aforementioned manner is built into the stator core, the coil end shown in FIG. 1 is formed. To be more specific, the direction of coil lamination is changed from the radial direction to the axial direction, in a manner similar to drawing an arc using the outermost portion of the coil of each phase. The coil end of the W-phase coil protrudes most conspicuously in the axial direction from the end face of the stator core 12 in the axial direction (exhibits the longest protrusion). However, the height in the radial direction from the surface of the inner periphery of the stator core 12 is the smallest. Conversely, the coil end of the U-phase coil exhibits the shortest protrusion in the axial direction from the end face of the stator core 12 in the axial direction, and the height in the radial direction from the surface of the inner periphery of the stator core 12 is the greatest. For the coil end of the V-phase coil, the protrusion in the axial direction from the end face of the stator core 12 in the axial direction is smaller than that of the W-phase coil but greater than that of the U-phase coil. Further, for the coil end of the V-phase coil, the height in the radial direction from the surface of the inner periphery of the stator core 12 is greater than that of the W-phase coil and smaller than that of the U-phase coil.

Figure 8:
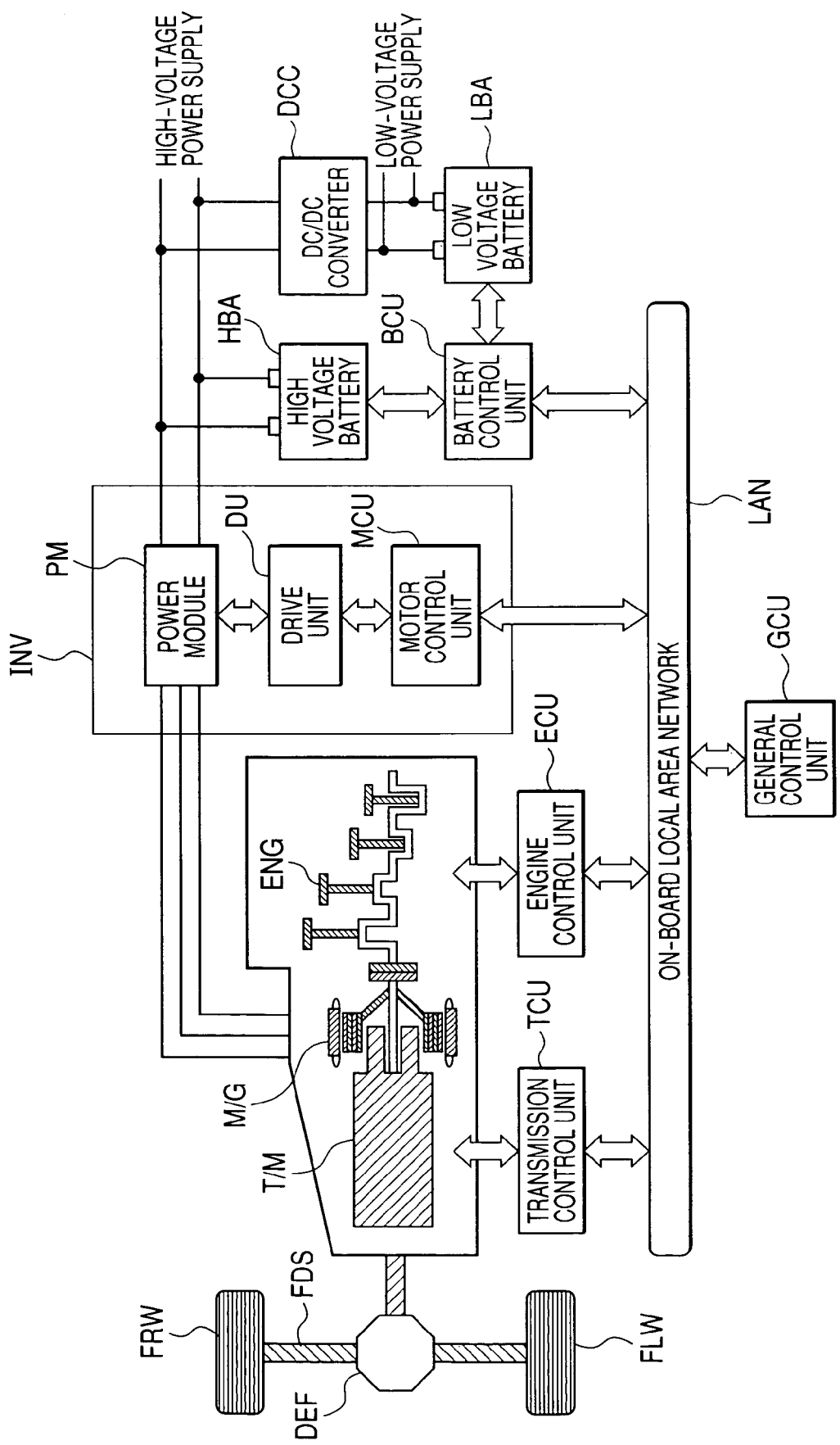
FIG. 8 is a diagram showing the system configuration of a hybrid vehicle using rotating electrical machine as an embodiment of the present invention.

Referring to FIG. 8, the following describes the system configuration of a hybrid vehicle using a rotating electrical machine of the present embodiment. FIG. 8 is a diagram showing the system configuration of a hybrid vehicle using rotating electrical machine as an embodiment of the present invention.

The hybrid vehicle of the present embodiment comprises two functions; the function of an engine power train powered by an engine ENG as an internal combustion engine; and the function of an electronic power train powered by an A.C. motor generator M/G. The A.C. motor generator M/G is a rotating electrical machine illustrated in FIGS. 1 through 7, and is provided with the aforementioned configuration. The engine ENG drives the wheels of a vehicle through the transmission. Further, the energy thereof is stored in a high-voltage battery as an electric energy, and is used as energy when the A.C. motor generator M/G operates as a motor.

The A.C. motor generator M/G works as a motor and is used for the traveling of a vehicle at the time of startup and low-speed traveling. To recover the energy when the vehicle is running, the A.C. motor generator M/G is operated under the control of regenerative braking in the deceleration mode, and serves as a generator. In the system shown in FIG. 8, the engine ENG is automatically stopped when stopping the vehicle to wait for a traffic light at an intersection, despite the operation mode. The vehicle is started by the torque of the A.C. motor generator M/G. After that, the engine ENG is automatically started, according to this control method. The vehicle traveling energy in the deceleration mode is collected by the A.C. motor generator M/G, and this arrangement improves the fuel economy. Further, the A.C. motor generator M/G is used as a motor to provide torque for running of the vehicle. Further, use of the engine is minimized in the operation mode where a large volume of deleterious substance is contained in the emission gas of the engine. This control method reduces the amount of emission gas.

The front of the vehicle has a front drive shaft FDS supported rotatably thereby. Front wheels FRW and FLW are provided on both ends of the front drive shaft FDS. A deferential gear DEF as a power distribution mechanism is installed at the center of the front drive shaft FDS. The deferential gear DEF distributes the rotation drive force to the front drive shafts FDS on the right and left, the rotation drive force being transmitted through the transmission T/M from the engine ENG. The transmission T/M changes the speed of the rotation drive force of the engine ENG and transmits it to the deferential gear DEF. The engine ENG is controlled by controlling the actuators such as the injector for controlling the amount of fuel supply and the throttle apparatus for controlling the amount of air supply, by using the engine control unit ECU. The speed change operation by the transmission T/M is controlled by the transmission control unit TCU.

The A.C. motor generator M/G is arranged together with the engine ENG, in the engine room provided on the front portion of the car body. The A.C. motor generator M/G is installed between the engine ENG and transmission T/M. The rotor is mechanically coupled with the input shaft of the transmission T/M. This arrangement allows the A.C. motor generator M/G to transmit the rotation drive force to the engine ENG, and to receive the rotation drive force from the engine ENG.

A space is created inside the A.C. motor generator M/G as a rotating electrical machine. Part of the end of the transmission T/M is arranged in this space provided inside the A.C. motor generator M/G. The rotating electrical machine was described with reference to FIG. 1. Inside the rotor of the A.C. motor generator M/G, as shown in FIG. 8, a space is provided between the shaft of the A.C. motor generator M/G and the interior of the rotor. In the present embodiment, part of the transmission is arranged in this space. To prevent contamination, it is also possible to make such an arrangement that a thin cover is provided on the internal surface of the rotor and a space is formed inside this cover. This arrangement prevents intrusion of dust and contamination, as described above, and avoids the trouble that may be caused when an object arranged in this space is brought in contact with the surface of the rotor rotating at a high speed.

A clutch is mounted between the shaft of the A.C. motor generator M/G and the shaft of the engine ENG. When the vehicle is driven only by the A.C. motor generator M/G, this clutch is disengaged and the engine is disconnected from the transmission. To start the engine during the traveling only by the A.C. motor generator M/G, the clutch is disengaged and the engine speed is increased. Under this condition, the fuel or ignition energy is supplied to allow complete explosion.

The energy for operating the A.C. motor generator M/G as a motor is supplied from the on-board power supply of the 300-volt system (200 through 350 V), for example, composed of the high-voltage battery HBA. The direct current from the on-board power supply is converted into the A.C. by the inverter apparatus INV and is supplied to the A.C. motor generator M/G. The inverter apparatus INV comprises:

a power module PM composed of a semiconductor switching device such as IGBT and MOS-FET;

a drive unit DU for on-off drive of the semiconductor switching device constituting the power module PM; and a control unit MCU for the rotating electrical machine to control the A.C. motor generator M/G.

The direct current voltage of the high-voltage battery HBA is supplied to the inverter apparatus INV and is converted into the 3-phase A.C. by the inverter apparatus INV. The 3-phase A.C. controlled by the inverter apparatus INV is supplied to the stator coil of the A.C. motor generator M/G as a rotating electrical machine. This causes a revolving field and the rotor rotates with respect to the stator. This arrangement allows the A.C. motor generator M/G to work as a motor and to generate the drive force to help the engine ENG to drive the vehicle.

In the meantime, the A.C. motor generator M/G as a rotating electrical machine has its rotor equipped with a permanent magnet. When the rotor is driven by the rotation force from the wheel or the rotation drive force from the engine ENG, voltage is induced to the stator coil. This procedure allows the A.C. motor generator M/G to be operated as a motor and to generate the 3-phase A.C. power for charging the high-voltage battery HBA. The 3-phase A.C. is converted into the direct current power by the inverter apparatus INV, and is used to charge the high-voltage battery HBA. A generator is provided in addition to the aforementioned A.C. motor generator M/G. The rotation torque from the engine and the wheel in the deceleration mode can be transmitted to the aforementioned generator. If consideration is given to the motor characteristics and downsizing when manufacturing the aforementioned A.C. motor generator M/G, the function of the A.C. motor generator M/G as a motor may be insufficient. In this case, another generator is preferably installed.

A 14-volt on-board power supply composed of a low voltage battery LBA is also provided. To supply current to the equipment mounted on the vehicle such as a light, radio and direction indicator (not illustrated), the low voltage on-board power supply is electrically connected thereto in parallel. A DC/DC converter DCC is arranged between the high-voltage battery HBA and low voltage battery LBA. It supplies power the high-voltage battery by stepping up the voltage from low voltage direct current power supply, or converts the output of the high-voltage battery HBA into the direct current low voltage to supply it to the low voltage battery LBA. Transmission of power between the high-voltage battery HBA and low voltage battery LBA is controlled by the battery control unit BCU.

The transmission control unit TCU, engine control unit ECU, control unit MCU for rotating electrical machine and battery control unit BCU are controlled by a general control unit GCU through the on-board local area network LAN. The general control unit GCU controls the transmission control unit TCU, engine control unit ECU, control unit MCU for rotating electrical machine and battery control unit BCU, whereby general control of the hybrid car is provided.

Figure 9:
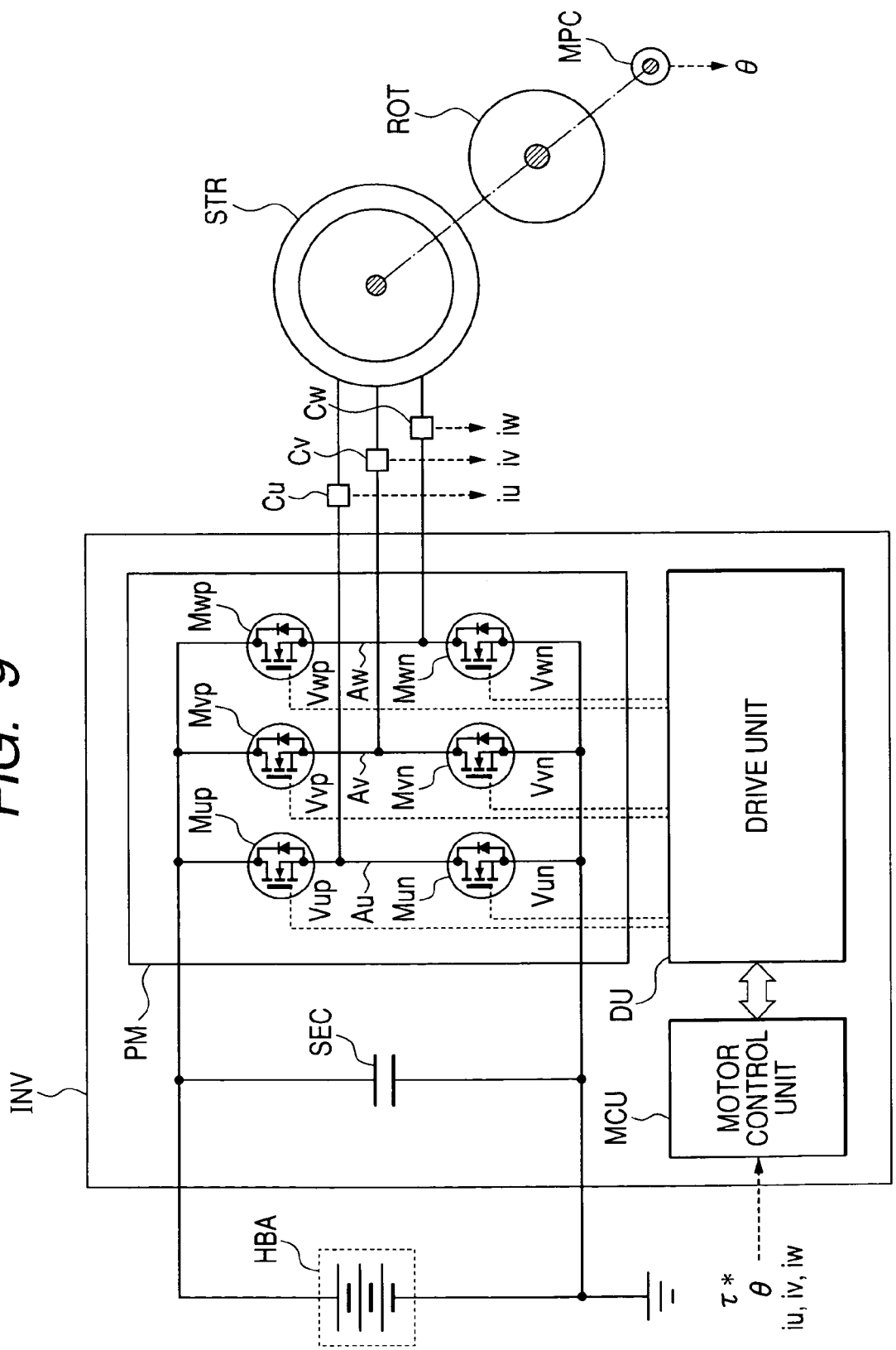
FIG. 9 is a power drive system configuration of the rotating electrical machine of a hybrid car using the rotating electrical machine as an embodiment of the present invention.

Referring to FIG. 9, the following describes the drive system configuration of the rotating electrical machine of a hybrid car using the rotating electrical machine of the present embodiment. FIG. 9 is a power drive system configuration of the rotating electrical machine of a hybrid car using the rotating electrical machine as an embodiment of the present invention. In this embodiment, a power MOS is used as a switching device. It is possible to use other switching device such as an IGBT. For example, when the IGBT is used, the diodes arranged in parallel connection is required. As described above, the same reference numerals as those of the other drawings indicate the same component parts.

The power module PM is composed of a parallel connection among a series circuit between the U-phase upper arm switching device Mup and the U-phase under arm switching device Mun; a series circuit between the V-phase upper arm switching device Mvp and V-phase under arm switching device Mvn; and a series circuit between the W-phase upper arm switching device Mwp and W-phase under arm switching device Mwn. It converts the direct current power supplied from the high-voltage battery HBA, into the A.C. power, which is supplied to the three-phase stator coil of phases U, V and W constituting the stator 10 of the rotating electrical machine. The rotor 20 is driven by the magnetomotive force generated by the current flowing to the three-phase stator coil.

Currents iu, iv and iw supplied to the three-phase stator coils are each detected by current detectors Cu, Cv and Cw. As the rotor 20 rotates, the magnetic pole position θ of the rotor 20 is detected by the magnetic pole position detector MPC.

The control unit MCU for rotating electrical machine outputs the command signal for controlling the operation of the drive unit DU, to the drive unit DU, in response to (1) the command signal from the high-order control unit such as an engine control unit 60 and general control unit GCU, and (2) various detection signals (feedback signals) regarding the interphase voltage of the A.C. motor generator M/G as a rotating electrical machine and the terminal voltage of the battery HBA. Further, the control unit MCU for rotating electrical machine converts the currents iu, iv and iw detected by current detectors Cu, Cv and Cw, into the currents iq and id on the q-d coordinate axes by the magnetic pole position θ detected by the magnetic pole position detector MPC. The drive unit DU is controlled so that the currents iq and id will be the target values.

As described above, the present embodiment improves the coil space factor of the stator coil with respect to the stator core slot. This arrangement allows the thickness of the stator in the radial direction to be reduced, and hence a space to be created inside the rotating electrical machine. This space can be provided with a penetration hole so that other equipment such as the input shaft of the transmission is placed so as to penetrate the space. Part of the transmission can be placed inside. As described above, the length of the stator in the radial direction can be minimized, and the external dimensions of the rotating electrical machine can be kept to desired dimensions. This structure allows the rotating electrical machine to be manufactured, with the external dimensions hardly changed.

A twist section is provided between the coil end and slot insert so that the start and end of coil winding are located on the same surface. After a layer coil has been produced through lamination of a plurality of rectangular coils, this arrangement facilitates the work of connecting between layer coils as well as the work of wiring the thee-phase stator coil formed by serial connection of a plurality of layer coils.

What is claimed is:

1. A rotating electrical machine comprising:
    a stator; and
    a rotor, arranged inside the stator, rotatably shaft-supported through a gap on the peripheral surface of the stator;
    wherein said stator further comprises:
    a stator core; and
    stator coils incorporated into the stator core;
    wherein said stator core has a plurality of slots, provided continuously in an axial direction, formed in the circumferential direction; and said stator coils being composed of a plurality of phase coils continuously wound thereon, and the coil conductors being laminated;
    wherein each of said phase coils are flat rectangular conductors having a width greater than its height and comprises:
    two coil sides extending in the axial direction; and
    two coil ends, displaced by the twist section from both ends of the coil sides, extending in the circumferential direction;
    wherein said two coil sides are laminated into said two slots such that the direction of the height of the stator coil is the radial direction, separated with other, striding across said slots;
    wherein said two coil ends protruding in both axial directions from said slot are arranged on both ends of said stator core in the axial direction;
    wherein, of said plurality of phase coils, a plurality of the first phase coils have the coil ends thereof arranged on both ends of the stator core in the axial direction so that the lamination direction of said flat rectangular conductors in said coil ends will be the same as the axial direction;
    of said plurality of phase coils, a plurality of the second phase coils have the coil ends thereof arranged on both ends of the stator core in the axial direction so that the lamination direction of said flat rectangular conductors in said coil ends will be arranged at the middle angle of the axial direction and the radial direction; and the coil ends will stride across the adjacent twist sections of the first phase coils adjacent to each other in the circumferential direction, through the outside of the coil ends of the first phase coil; and
    wherein, of said plurality of phase coils, a plurality of the third phase coils have the coil ends thereof arranged on both ends of the stator core in the axial direction so that the lamination direction of said flat rectangular conductors in said coil ends will be the same as the radial direction; and the coil ends will stride across the adjacent twist sections of the first and second phase coils adjacent to each other in the circumferential direction, through the outside of the coil ends of the first and second phase coils.

2. The rotating electrical machine described in claim 1, wherein each of phase coils is twisted by the twist section in such a way that said coil conductors will be laminated on the surface of the coil conductor in one of said coil ends, and on the reversed surface of the coil conductor in the other of the coil ends.

3. The rotating electrical machine described in claim 1, wherein each of phase coils is twisted by the twist section in such a way that the direction of laminating the coil conductors in one of said coil ends is from top to bottom; whereas, in the other of said coil ends, the direction is from bottom to top.

4. The rotating electrical machine described in claim 3, wherein each of said phase coils is characterized in that the start of the coil conductor winding is formed on one of the coil ends, and the end of the coil conductor winding is formed on the other of the coil ends; wherein the start and end of winding are located on the upper layer of the laminate created by lamination of said coil conductors.

5. A rotating electrical machine, for providing a drive source for generating the drive force of a vehicle together with an internal combustion engine, arranged between a transmission for changing the drive force of the drive source and transmitting it to an axle, and the internal combustion engine; comprising:
    a stator; and
    a rotor, arranged inside the stator, rotatably shaft-supported through a gap on the peripheral surface of the stator;
    wherein said stator further comprises:
    a stator core; and
    stator coils incorporated into the stator core;
    wherein said stator core has a plurality of slots, provided continuously in an axial direction, formed in the circumferential direction; said stator coils being composed of a plurality of phase coils continuously wound thereon, and the coil conductors being laminated;
    wherein each of said phase coils are flat rectangular conductors having a width greater than its height and comprises:
    two coil sides extending in the axial direction; and
    two coil ends, displaced by the twist section from both ends of the coil
    sides, extending in the circumferential direction;
    wherein said two coil sides are laminated into said two slots such that the direction of height of the stator coil will be the radial direction, separated with other, striding across said slots;
    wherein said two coil ends protruding in both axial directions from said slot are arranged on both ends of said stator core in the axial direction;
    wherein, of said plurality of phase coils, a plurality of the first phase coils have the coil ends thereof arranged on both ends of the stator core in the axial direction so that the lamination direction of said flat rectangular conductors in said coil ends will be the same as the axial direction;

of said plurality of phase coils, a plurality of the second phase coils have the coil ends thereof arranged on both ends of the stator core in the axial direction so that the lamination direction of said flat rectangular conductors in said coil ends will be arranged at the middle angle of the axial direction and to the radial direction; and the coil ends will stride across the adjacent twist sections of the first phase coils adjacent to each other in the circumferential direction, through the outside of the coil ends of the first phase coil; and wherein, of said plurality of phase coils, a plurality of the third phase coils have the coil ends thereof arranged on both ends of the stator core in the axial direction so that the lamination direction of said flat rectangular conductors in said coil ends will be the same as the radial direction; and the coil ends will stride across the adjacent twist sections of the first and second phase coils adjacent to each other in the circumferential direction, though the outside of the coil ends of the first and second phase coils.

6. The rotating electrical machine described in claim 5, wherein each of phase coils is twisted by the twist section in such a way that said coil conductors will be laminated on the surface of the coil conductor in one of said coil ends, and on the reversed surface of the coil conductor in the other of the coil ends.

7. The rotating electrical machine described in claim 5, wherein each of phase coils is twisted by the twist section in such a way that the direction of laminating the coil conductors in one of said coil ends is from top to bottom; whereas, in the other of said coil ends, the direction is from bottom to top.

8. The rotating electrical machine described in claim 7, wherein each of said phase coils is characterized in that the start of the coil conductor winding is formed on one of the coil ends, and the end of the coil conductor winding is formed on the other of the coil ends; wherein the start and end of winding are located on the upper layer of the laminate created by lamination of said coil conductors.

* * * * *

UNITED STATES PATENT AND TRADEMARK OFFICE
CERTIFICATE OF CORRECTION

PATENT NO. : 7,569,966 B2  Page 1 of 1
APPLICATION NO. : 11/200198
DATED : August 4, 2009
INVENTOR(S) : Saito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Seventh Day of September, 2010

David J. Kappos
*Director of the United States Patent and Trademark Office*